United States Patent
Germain et al.

[11] Patent Number: 6,119,480
[45] Date of Patent: Sep. 19, 2000

[54] PLANT AND METHOD FOR LIQUID-PHASE FILTRATION OF A CRYOGENIC FLUID

[75] Inventors: Jean-Pierre Germain, Montigny le Bretonneux; Philippe Guillaume, Sucy en Brie; José Buil, Fresnes, all of France

[73] Assignee: L'Air Liquide, Societe Anonyme pour l'Etude et l'Exploitation des Procedes Georges Claude, Paris, France

[21] Appl. No.: 09/235,768

[22] Filed: Jan. 25, 1999

[30] Foreign Application Priority Data

Jan. 23, 1998 [FR] France ................................. 98 00725

[51] Int. Cl.[7] ..................................................... F25J 1/00
[52] U.S. Cl. ............................... 62/642; 62/50.2; 62/908
[58] Field of Search ........................... 62/50.2, 908, 642

[56] References Cited

U.S. PATENT DOCUMENTS

| | | | |
|---|---|---|---|
| 4,337,071 | 6/1982 | Yang | 62/908 |
| 4,759,848 | 7/1988 | Segura et al. | |
| 5,533,341 | 7/1996 | Schvester et al. | |
| 5,548,962 | 8/1996 | Luger et al. | 62/908 |
| 5,916,247 | 6/1999 | Castellanet et al. | 62/50.2 |

FOREIGN PATENT DOCUMENTS

| | | |
|---|---|---|
| 0762046 | 3/1997 | European Pat. Off. |
| 0802160 | 10/1997 | European Pat. Off. |
| 9609510 | 3/1996 | WIPO |

OTHER PUBLICATIONS

Patent Abstracts of Japan, vol. 017, No. 640, (E–1465), Nov. 26, 1993, & JP 05 206527 A (Taiyo Sanso C. Ltd.).
Copy of EP Search Report No. 552864 dated Oct. 12, 1998.

*Primary Examiner*—Ronald Capossela
*Attorney, Agent, or Firm*—Nixon Peabody LLP; Robert M. Schulman

[57] ABSTRACT

A plant for liquid-phase filtration of a cryogenic fluid comprising, in an ambient environment:
  a supply of a cryogenic fluid in liquid phase;
  a filtration component arranged between an inlet for feeding the cryogenic fluid and an outlet for use of the filtered cryogenic fluid, in which the filtration component filters microorganisms and/or particles and causes a head loss which is less than that which converts liquid phase to a solid or gaseous phase.

22 Claims, 1 Drawing Sheet

6,119,480

PLANT AND METHOD FOR LIQUID-PHASE FILTRATION OF A CRYOGENIC FLUID

BACKGROUND OF THE INVENTION (i) Field of the Invention

The present invention relates to a plant for liquid-phase filtration of a cryogenic fluid. It further relates to a filtration method and to a use of a filtration component for the filtration of such a cryogenic fluid in liquid phase.

The invention is applicable, in particular, in the agro-foodstuffs industrial field and in the pharmaceutical field. Since, it is necessary to guarantee perfect hygiene and asepsis of the cryogenic fluids employed the term "sterilized" cryogenic fluid is sometimes even used.

(ii) Description of Related Art

By way of illustration, when carbon dioxide ($CO_2$) is used as a refrigerant for cooling food products, it is necessary to ensure that it is free from pathogenic microorganisms and/or particles.

Similarly, and still by way of illustration, in the pharmaceutical field when nitrous oxide ($N_2O$) is dispensed to a patient in a ventilator, it has to be filtered beforehand in order to ensure that the gas is sufficiently pure.

It has been found that filtration of these cryogenic fluids is difficult because of the risks of vaporization or solidification (depending on the fluid in question) resulting from use of the filtration component. For example, in the case of carbon dioxide, the problem is therefore further exacerbated by the fact that liquid carbon dioxide has a tendency to be converted into the solid state, creating "dry ice" which obstructs the ducts in the filtration plant.

It is known, in order to filter liquid nitrogen in liquid phase (and therefore recover an essentially non-diphasic fluid at the filtration outlet) to arrange the filtration component inside a bath of cryogenic liquid (in general of the same type as the one to be filtered), providing continuous cooling of the filtration component.

Such a solution for the filtration of liquid nitrogen is proposed, for example, in the document U.S. Pat. No. 4,759,848.

Although such means for cooling the filtration component are indispensable for cryogenic fluids such as nitrogen and oxygen, which have very low liquefaction temperatures, it would be advantageous, for cryogenic fluids having higher liquefaction temperatures, such as carbon dioxide or indeed nitrous oxide, to provide filtration plants which are less elaborate, albeit equally effective in terms of filtered-particle size, which do not require the utilization of cooling means and in which the filter can be kept in ambient environment and, in particular, at ambient temperature in the region of 20 or 25° C.

The expression "ambient environment" means the atmospheric conditions of temperature and pressure prevailing in the room in which the filtration plant is arranged.

SUMMARY AND OBJECTS OF THE INVENTION

The object of the invention is to provide such a filtration/sterilization plant which obviates continuous cooling of the filtration component.

To this end, the invention relates to a plant for liquid-phase filtration of a cryogenic fluid having a liquid phase for at least one pressure/temperature pair lying between 6 and 25 bar, on the one hand, and −100° C. and 0° C. on the other hand, including, in ambient environment, a filtration component arranged between an inlet for feeding the cryogenic fluid and an outlet for use of the filtered cryogenic fluid, in which the filtration component is capable of filtering microorganisms and/or particles whose size is greater than or equal to 0.1 μm, and is designed to cause a head loss of less than 7 bar, which plant includes, at the feed inlet, means for supplying the filtration component with the cryogenic fluid in liquid phase.

According to particular embodiments, the plant may have one or more of the following characteristics:

- the filtration component is capable of filtering microorganisms and/or particles whose size is greater than or equal to 0.2 μm;
- the filtration component is designed to cause a head loss of less than 5 bar;
- the means for supplying the filtration component with the cryogenic fluid in liquid phase are capable of supplying the cryogenic fluid in liquid phase under a pressure of between 6 and 60 bar and at a temperature of between −100° C. and 0° C.;
- the plant includes an overflow whose inlet is tapped upstream of the filtration component;
- the overflow has a differential release pressure of between 2 and 10 bar;
- the means for supplying the filtration component with the cryogenic fluid in liquid phase include a tank for storing the cryogenic fluid under pressure, and the plant furthermore includes an overflow whose inlet is tapped upstream of the filtration component and whose outlet is connected to the tank;
- the filter is a micropore ceramic filter defining a set of parallel inlet channels;
- the means for supplying the cryogenic fluid in liquid phase are designed to supply the fluid under a pressure of between 16 and 25 bar and at a temperature of between −25° C. and −15° C.

As will have been understood from reading the text above, the cryogenic fluids relevant to the present invention are those having a liquid phase for at least one pressure/temperature pair lying between 6 and 25 bar, on the one hand, and −100° C. and 0° C. on the other hand.

It is nevertheless possible to feed the filtration component under pressure/temperature conditions outside these ranges, the most important thing being that it is in liquid phase, for example as indicated above under a pressure lying between 6 and 60 bar for certain fluids such as $CO_2$.

The invention furthermore relates to a method for liquid-phase filtration of a cryogenic fluid having a liquid phase for at least one pressure/temperature pair lying between 6 and 25 bar, on the one hand, and −100° C. and 0° C. on the other hand, according to which the cryogenic fluid in liquid phase is introduced to the inlet of a filtration component which is capable of filtering microorganisms and/or particles whose size is greater than or equal to 0.1 μm, is designed to cause a head loss of less than 7 bar and is arranged in ambient environment.

As a variant, outside phases in which the filtered cryogenic fluid has been consumed, the liquid cryogenic fluid is circulated in a loop, at least periodically and at least upstream of the filtration component.

The invention also relates to the use of a filtration component, arranged in ambient environment, capable of filtering microorganisms and/or particles whose size is greater than or equal to 0.1 μm, and designed to cause a head loss of less than 7 bar, for liquid-phase filtering of a cryogenic fluid having a liquid phase for at least one pressure/temperature pair lying between 6 and 25 bar, on the one hand, and −100° C. and 0° C. on the other hand.

The invention will be understood more clearly on reading the following description, given solely by way of example and made with reference to the drawings.

DETAILED DESCRIPTION OF PREFERRED EMBODIMENTS

Figure 1:
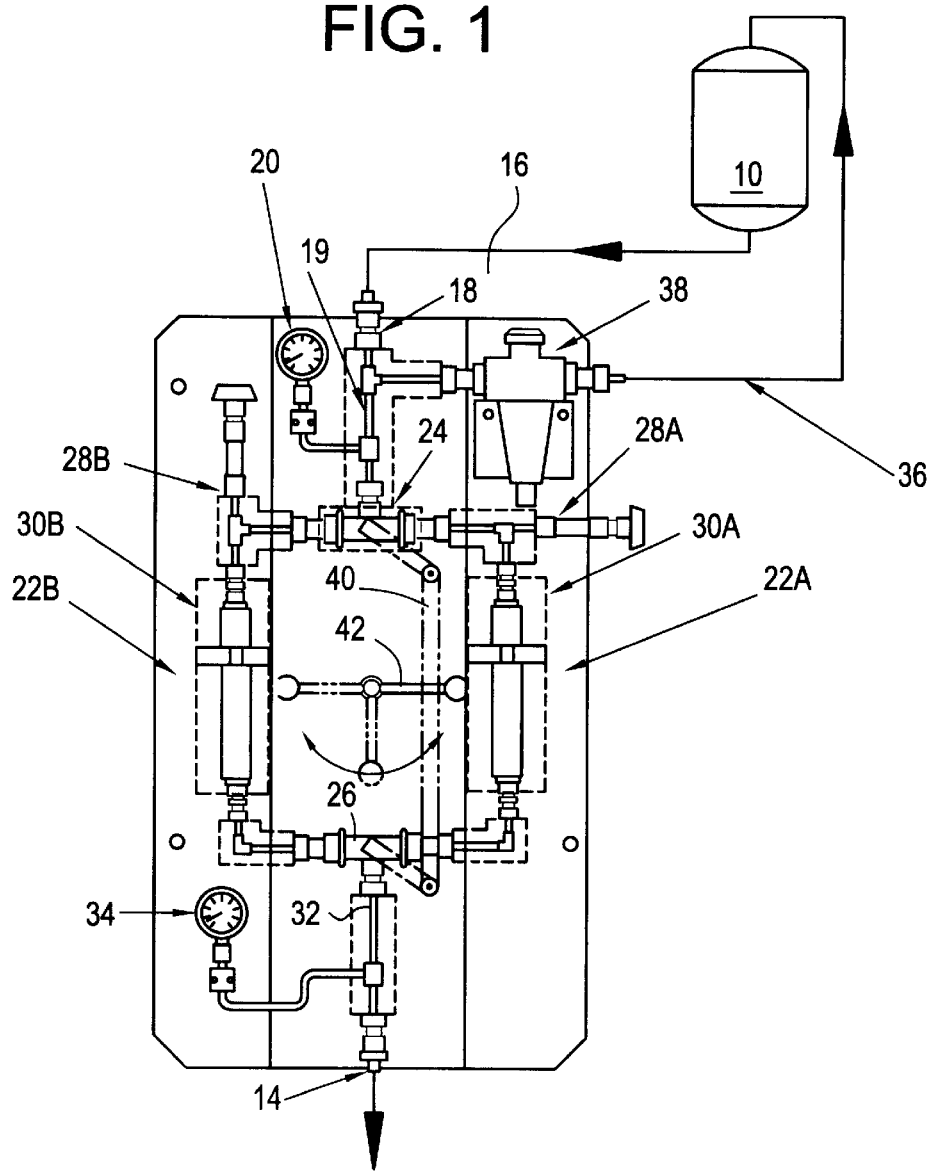
FIG. 1 is a schematic view of a plant for distribution of a cryogenic fluid, including a filtration plant according to the invention.

The plant for distribution of a liquid cryogenic fluid, for example liquid carbon dioxide, which is represented in FIG. 1 includes a tank 10 for storing the fluid, for example liquid carbon dioxide.

For the sake of simplicity, the plant for distribution of a liquid cryogenic fluid of FIG. 1 will be referred to below as a plant "for distribution of liquid carbon dioxide", while clearly keeping in mind that it would also be suitable for the distribution of other fluids lying within the scope of the present invention.

The tank 10 of FIG. 1 is connected to a filtration plant 12 according to the invention, at the outlet denoted 14 of which a distributor of filtered carbon dioxide is provided.

The tank 10 is designed to store liquid carbon dioxide at a temperature of between −25° C. and −15° C., and advantageously substantially equal to −20° C., and under a pressure of between 17 bar and 23 bar and advantageously substantially equal to 20 bar. An opening formed in the bottom of the tank 10 is connected via a duct 16 to an inlet 18 for feeding the filtration plant. This inlet is provided with a manometer 20.

The inlet 18 is connected via a duct 19 to two parallel filtration branches denoted 22A, 22B. These two branches are identical and are fed from a bypass valve 24 designed to selectively connect the feed inlet 18 to one or the other of the branches 22A, 22B. At the outlet, these two branches converge to a bypass valve 26.

Each branch includes, successively along the flow path of the liquid carbon dioxide, a valve 28A, 28B and a filtration component 30A, 30B. The outlets of the filters are connected to the two inlets of the bypass valve 26.

The common outlet of the valve 26 is connected, by means of a duct 32, to the distribution outlet 14.

This outlet 14 is provided with a dry-ice production unit (not shown) comprising a ten-meter hose equipped with a gun (not shown) for delivering carbon dioxide in solid form.

As a variant, the outlet 14 is provided with a set of rigid pipes which may be connected to tunnels, cells or other cryogenic cooling equipment, for example equipment for treating food products, or alternatively pharmaceutical reactors.

A pressure manometer 34 is tapped on the duct 32.

Furthermore, a return duct 36 is provided between the duct 19 upstream of the bypass valve 24 and the upper part of the storage tank 10. This bypass duct 36 is provided with an overflow 38 whose calibration pressure here lies between 6 and 10 bar, and is advantageously substantially equal to 8 bar. The calibration pressure corresponds to the differential pressure between the inlet and the outlet of the overflow, above which it is released and delivers.

The two valves 24 and 26 have their control stems connected to the same rod 40 operated by a single actuation handle 42. The two valves are thus operated so as to simultaneously connect in a selective manner the inlet 18 and outlet 14 of the plant either to the filtration branch 22A or to the filtration branch 22B.

Each of the elements of the filtration plant is advantageously covered by tubular thermal insulation elements (lagging) avoiding a loss of cooling power from the plant to the surrounding atmosphere.

The two filtration components 30A, 30B are here filtering modules marketed in France by the Société des Céramiques Techniques de Tarbes under the name "Membralox". In the embodiment which is represented, the filtration component has a length of 11 inches and a pore size of 0.01 micron. It should be noted that these filtering modules are sold and described by the manufacturer as to be used for the filtration of a gas flow.

The work carried out by the Applicant Company has made it possible to show that such a "gas" filter is suitable for the filtration of the cryogenic fluids relevant to the present invention, in ambient environment, under the conditions advocated by the present invention.

Such a filtering element includes a tubular outer metal casing provided, at its ends, with an inlet for the fluid to be filtered and with an outlet for discharging the filtered fluid.

Figure 2:
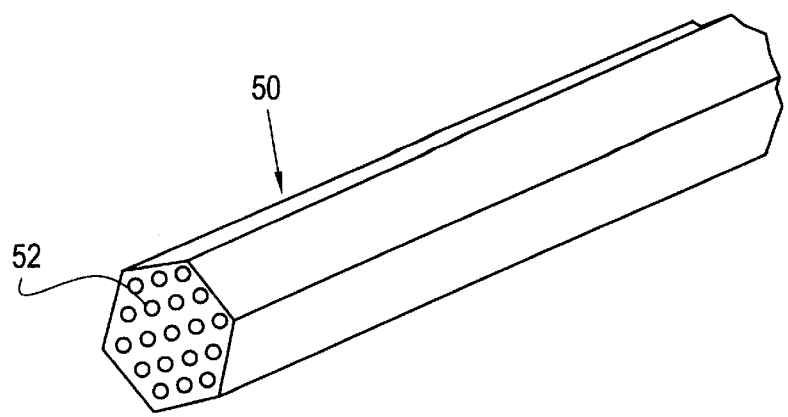
FIG. 2 is a perspective view of a filtration membrane employed in the plant of FIG. 1.

A filtering element, called a membrane, is arranged inside the casing. This membrane is represented in FIG. 2 and denoted by the reference 50. The membrane is made of micropore ceramic.

This membrane has a tubular external shape of hexagonal cross section. It includes a set of parallel channels 52 which are open at one end and are closed off at the other end. The face onto which the channels 52 open is arranged as the inlet of the filter. The fluid to be filtered thus penetrates the filtering membrane through the channels 52 and emerges from it through its lateral surface, of hexagonal cross section, before escaping through the discharge outlet of the filtration component.

In the plant and the application which is represented, when the distribution outlet 14 is open, so that it delivers liquid carbon dioxide at its end, the flow rate passing through one of the filtration components 30A or 30B lies typically between 30 to 50 kg/h.

For such a flow rate, the filter causes here a head loss of the order of 0.5 bar.

The plant described in FIG. 1 operates as follows.

When the outlet 14 for delivering carbon dioxide is open, the liquid carbon dioxide leaving the storage tank 10 is sent to the inlet 18 of the filtration plant. It arrives at this inlet at a temperature substantially equal to −20° C., under a pressure substantially equal to 20 bar. Depending on the position of the control component 42, the carbon dioxide is sent into one or other of the branches 22A, 22B.

The liquid carbon dioxide then flows into one of the filtration components. On passing through the filtration component, it experiences a slight reduction in its pressure because of the head loss resulting from the filtration component. However, in the present case of filtering $CO_2$, the pressure at the outlet of the filtration component still remains higher than the solidification pressure (dry ice formation pressure) of the carbon dioxide at the pressure in question. This is typically 5.33 bar at −20° C. The carbon dioxide therefore flows in liquid phase as far as the outlet 14 of the filtration plant.

When the outlet 14 is closed off, for example because of an intentional action by the user on a valve, thus wishing to stop the distribution, the carbon dioxide ceases to flow through one of the filtration loops.

It will then be seen that, under the effect of ambient temperature, the carbon dioxide upstream of this valve and therefore, in particular, upstream of the outlet 14 and on the portion lying upstream of the active filtration component, experiences an increase in temperature which causes a rise in pressure.

It will be understood that, unless it is controlled, such a pressure rise can lead to the formation of gas in the circuit, and therefore cause serious difficulties (reconditioning time) when the plant is returned to operation.

For this reason, the plant which is represented advantageously includes the overflow 38 which functions as follows: when, because of the shutdown, the pressure in the pipe 19 has increased by about 8 bar (differential pressure for release of the overflow) relative to the pressure in the storage tank 10, that is to say it has reached a pressure substantially equal to 28 bar, the overflow 38 is turned on and thus allows liquid carbon dioxide to flow to the tank 10 (the gas phase which may be extracted in this way will feed the overhead gas in the tank 10).

The existence of such a return loop ensures that the carbon dioxide is kept in exclusively liquid form irrespective of the point in the plant and irrespective of the time which has elapsed since a withdrawal was last made from the outlet 14 of the plant.

As already indicated, such a plant can be used for a variety of cryogenic fluids having a liquid phase for at least one pressure/temperature pair lying between 6 and 25 bar and −100° C. and 0° C.

In order to guarantee that cryogenic liquid in exclusively liquid form is obtained at the outlet of the plant, the filtration component should cause a head loss of less than 7 bar and, preferably, less than 5 bar, typically lying between 0.2 and 5 bar. Further, the pressure upstream of the filtration component should be sufficient for, in the case of $CO_2$ for example, the difference between the pressure at the feed inlet and the head loss to be greater than the solidification pressure of the cryogenic fluid.

Such a plant is also suitable for the filtration of liquid nitrous oxide stored, for example, under a pressure of between 16 and 25 bar and advantageously equal to 20 bar, and at a temperature of between −25° C. and −15° C., and advantageously substantially equal to −20° C.

Experiments carried out in the pharmaceutical field using the plant described here have shown that it provides filtration of the cryogenic fluid in liquid phase for impurities having a diameter greater than 0.1 $\mu$m.

The presence of the two filtration branches 22A, 22B allows a filtration component to be replaced or cleaned without it being necessary to shut down the plant. In order to remove one of the filtration components, it is sufficient to divert the liquid flow through the other filtration component.

By way of illustration, in order to clean the plant, and in particular the filtration components, or even sterilize them, for example between two periods of use, a sterilization operation may be carried out such as that traditionally recommended by the Pharmacopeia, such as one using a hot fluid, for example a hot gas (for example steam).

For further information regarding these operations of sterilizing plants using a hot fluid, reference may for example be made to the following two documents: EP-A-762046 and WO96/09510.

Considering, for example, the plant in FIG. 1, it is thus entirely possible to provide it with means (not shown in this figure) for sending steam (or another hot fluid) into the plant, for example via an extra line which is tapped at the inlet 18 (using the hot gas to flush not only the filters and downstream of the filters, but also upstream of the filters—represented by the portion 19), or else by way of illustration tapped on the duct 19 just upstream of the bypass valve 24 (using the hot gas to flush the filters and downstream of the filters).

In such a case, a tap (for example at the outlet 14) will advantageously be provided for discharging the condensates.

Although the present invention has been described with reference to particular embodiments, it is in no way limited by this and, moreover, may receive modifications and variants which occur to the persons skilled in the art in the scope of the claims which follow.

What is claimed is:

1. A plant for liquid-phase filtration of a cryogenic fluid comprising, in an ambient environment:
   a supply of a cryogenic fluid in liquid phase, wherein said cryogenic fluid exists as a liquid phase for at least one pressure/temperature pair lying between about 6 and 25 bars and between about −100° and 0° C.;
   a filtration component arranged between an inlet for feeding the cryogenic fluid from said supply and an outlet for use of the filtered cryogenic fluid, in which the filtration component filters at least one of microorganisms and particles and causes a head loss which is less than that which converts said liquid phase to a solid or gaseous phase.

2. The plant according to claim 1, wherein at least one of said microorganisms and particles have a size greater than or equal to about 0.1 $\mu$m.

3. The plant according to claim 1, wherein the head loss is less than 7 bars.

4. The plant according to claim 3, wherein the head loss is less than 5 bars.

5. The plant according to claim 1, wherein the cryogenic fluid supplied by the supply of cryogenic fluid in liquid phase is at a pressure between about 6 and 60 bars.

6. The plant according to claim 1, further comprising an overflow including an inlet and an outlet, wherein the inlet is tapped upstream of the filtration component.

7. The plant according to claim 6, wherein the supply comprises a tank for storing the cryogenic fluid under pressure and wherein the outlet of the overflow is connected to said tank.

8. The plant according to claim 1, wherein the filtration component is a micropore ceramic filter defining a set of parallel inlet channels.

9. The plant according to claim 1, which is adapted for filtration of carbon dioxide in liquid phase, wherein the supply of the cryogenic fluid in liquid phase is adapted to supply the fluid under a pressure of between about 17 and 23 bars and at a temperature of between about −25° C. and −15° C.

10. The plant according to claim 9, further comprising an overflow including an inlet and an outlet, wherein the inlet is tapped upstream of the filtration component, wherein the overflow has a differential release pressure of between about 2 and 10 bars.

11. The plant according to claim 1, which is adapted for filtration of nitrous oxide in liquid phase, wherein the supply of the cryogenic fluid in liquid phase is adapted to supply the fluid under a pressure of between about 16 and 25 bars and at a temperature of between about −25° C. and −15° C.

12. The plant according to claim 1, further comprising a hot fluid generator which flushes at least one of the following portions using this hot fluid:
   the portion lying between the inlet for feeding the cryogenic fluid and the outlet for use of the filtered cryogenic fluid, including the filtration component;
   the filtration component and the portion lying between this component and the outlet for use of the filtered cryogenic fluid.

13. The plant according to claim 12, wherein the hot fluid is steam.

14. A method for liquid-phase filtration of a cryogenic fluid comprising the steps of introducing the cryogenic fluid in liquid phase to an inlet of a filtration component which filters at least one of microorganisms and particles and which causes a head loss which is less than that which converts said liquid phase to a solid gaseous phase, in an ambient environment, wherein said cryogenic fluid exists as a liquid phase for at least one pressure/temperature pair lying between about 6 and 25 bars and between about −100° and 0° C.

15. The method according to claim 14, wherein at least one of said microorganisms and particles have a size greater than or equal to about 0.1 $\mu$m.

16. The method according to claim 14, wherein the head loss is less than about 7 bars.

17. The method according to claim 16, wherein the head loss of the fluid inside the filtration component is less than about 5 bars.

18. The method according to claim 14, wherein the head loss of the fluid inside the filtration component is between about 0.05 bar and 5 bars.

19. The method according to claim 18, wherein the head loss of the fluid inside the filtration component is greater than or equal to about 0.2 bar.

20. The method according to claim 14, further comprising the step of introducing the cryogenic fluid to the inlet of the filtration component under a pressure of between about 6 and 60 bars.

21. The method according to claims 14, further comprising the step of circulating the liquid cryogenic fluid in a loop at least periodically and at least upstream of the filtration component when the cryogenic fluid is not being consumed.

22. The method according to claim 14, wherein the cryogenic fluid at the feed inlet has a pressure such that, when the head loss is subtracted, the difference is higher than the solidification pressure of the cryogenic fluid in question.

* * * * *